US011847481B2

(12) United States Patent
Zan et al.

(10) Patent No.: US 11,847,481 B2
(45) Date of Patent: Dec. 19, 2023

(54) SECURITY IN A COMPUTING ENVIRONMENT BY AUTOMATICALLY DEFINING THE SCOPE AND SERVICES OF COMPONENTS WITHIN THE COMPUTING ENVIRONMENT

(71) Applicant: VMware, Inc., Palo Alto, CA (US)

(72) Inventors: Bin Zan, Santa Clara, CA (US); Zhen Mo, Sunnyvale, CA (US); Vijay Ganti, Fremont, CA (US); Vamsi Krishna Akkineni, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 1078 days.

(21) Appl. No.: 16/514,059

(22) Filed: Jul. 17, 2019

(65) Prior Publication Data
US 2021/0019577 A1 Jan. 21, 2021

(51) Int. Cl.
G06F 9/455 (2018.01)
G06F 17/16 (2006.01)
G06N 20/00 (2019.01)
G06F 18/2415 (2023.01)

(52) U.S. Cl.
CPC ......... G06F 9/45558 (2013.01); G06F 17/16 (2013.01); G06F 18/2415 (2023.01); G06N 20/00 (2019.01); G06F 2009/45591 (2013.01)

(58) Field of Classification Search
CPC ...... G06N 20/00; G06N 7/005; G06N 3/0454; G06N 5/003; G06N 5/022; G06N 3/08; G06N 20/10; G06N 20/20; G06N 7/00; G06N 3/088; G06N 5/02; G06N 3/04; G06N 3/0472; G06N 3/0481; G06N 3/10; G06N 5/04; G06N 3/02; G06N 3/084; G06N 3/126; G06N 5/046; G06N 5/048; G06F 16/285; G06F 17/16; G06F 21/566; G06F 2221/034; G06F 16/24578; G06F 21/56; G06F 21/577; G06F 40/30; G06F 16/90335; G06F 21/564; G06F 2111/10; G06F 30/20; G06F 16/2465; G06F 16/254; G06F 16/35; G06F 2221/033; G06F 11/0709; G06F 11/0751; G06F 11/0787; G06F 11/162; G06K 9/6232; G06K 9/6218; G06K 9/6228; G06K 9/6215; G06K 9/6262; G06K 9/00523; G06K 9/6231; G06K 9/6269; G06K 9/6224; G06K 9/6277; G06K 9/00496; G06K 9/0051; G06K 9/00536; G06K 9/6219; G06K 9/622;

(Continued)

(56) References Cited

U.S. PATENT DOCUMENTS 9,465,942 B1 * 10/2016 Kane-Parry ............. G06F 21/57
9,948,663 B1 *  4/2018 Wang .................. H04L 63/1416
10,574,700 B1 *  2/2020 Dell'Amico ........ H04L 63/1416

(Continued)

Primary Examiner — Golam Sorowar

(57) ABSTRACT

A feature selection methodology is disclosed. In a computer-implemented method, components of a computing environment are automatically monitored, and have a feature selection analysis performed thereon. Provided the feature selection analysis determines that features of the components are well defined, a classification of the features is performed. Provided the feature selection analysis determines that features of the components are not well defined, a similarity analysis of the features is performed. Results of the feature selection methodology are generated.

12 Claims, 7 Drawing Sheets

(58) Field of Classification Search
CPC .... G06K 9/623; G06K 9/6245; G06K 9/6247; G06K 9/6253; G06K 9/6256; G06K 9/627
See application file for complete search history.

(56) References Cited

U.S. PATENT DOCUMENTS

| | | | |
|---|---|---|---|
| 2019/0004790 A1* | 1/2019 | Choudhary | G06F 21/44 |
| 2019/0222601 A1* | 7/2019 | Bardenstein | H04L 63/1416 |
| 2020/0045164 A1 | 2/2020 | Kwatra et al. | |
| 2020/0233955 A1 | 7/2020 | Ramzan et al. | |
| 2020/0312172 A1 | 10/2020 | Rönnäng et al. | |

* cited by examiner

Add members to App Tier
Selected members ( APP-TIER-1-P X ) ( APP-TIER-2-P X ) ( prod-east01-ubu1604-appdef-01 X )

Suggested VMs with similar characteristics

☑ VM1  
Criteria one here  
Criteria two for match here  
Criteria three goes here  
98% MATCH ☐ VM2  
Criteria one here  
Criteria two for match here  
Criteria three goes here  
94% MATCH ☐ VM3  
Criteria one here  
Criteria two for match here  
Criteria three goes here  
92% MATCH

3 MORE >>

All available VMs

| ☐ | Name ▼ | IP ▼ | OS ▼ | State ▼ |
|---|---|---|---|---|
| ☐ | prod-east01-ubu1604-appdef-03 | Unknown | Ubuntu Linux (64-bit) | Modules missing |
| ☐ | prod-east01-ubu1604-appdef-01 | Unknown | Ubuntu Linux (64-bit) | Modules missing |

*FIG. 7*

SECURITY IN A COMPUTING ENVIRONMENT BY AUTOMATICALLY DEFINING THE SCOPE AND SERVICES OF COMPONENTS WITHIN THE COMPUTING ENVIRONMENT

BACKGROUND ART

In a machine learning environment, feature selection (sometimes referred to as "variable selection", "attribute selection", or similar) is a critical part of the machine learning process. Feature selection specifically refers to determining which features are important and, therefore, should be used in the creation and operation of a machine learning model. In the feature selection process, a subset of important and/or relevant features is selected from a larger set of features. The subset of important and/or relevant features are then deemed to be of importance to and are, therefore, used in the construction of the machine learning environment.

In various computing environments, including machine learning environments, it is necessary to provide security for the various components in the computing environment against numerous cyber threats. One such security measure is provided by the AppDefense™ platform 804 of VMware, Inc developed by VMware, Inc. of Palo Alto, California. Typically, a system administrator (e.g., an Information Technology (IT) administrator, or the like) registers those machines or components of the computing environment, for which the IT administrator desires protection against cyber threats, with a security system such as the above-mentioned AppDefense™ platform 804 of VMware, Inc. Conventionally, the IT administrator registers the machines or components by manually defining or listing the components, including virtualized machines or components, within the computing environment that are to be registered with the security system being used. Once the various machines or components (virtual and/or physical) are registered with the security system, the various machines or components are protected by the security system. Conversely, machines or components which are not registered with the security system are not protected by the security system. It will be understood that due to the number of machines or components typically found in a computing environment (and due to the computational overhead required for the security system to monitor the registered machines or components) it is only feasibly to register a subset of the machines or components with the computing environment.

In such conventional approaches, the level of protection for the computing environment is highly dependent upon the knowledge or experience of the IT administrator. For example, an IT administrator may incorrectly choose to not register various machines or components for protection by the security system. Moreover, as the complexity of the computing environment increases and the number of machines or components therein increases, it is highly likely that the IT administrator may unintentionally "miss" or "forget" to register certain machines or components for protection by the security system. Further, in a machine learning environment, the IT administrator may simply not be aware of the importance of particular machines or components to the machine learning environment, and, therefore, the IT administrator will fail to list those machines or components for protection by the security system. As a result, it is possible that even important and/or extremely relevant features of a machine learning environment may not be properly registered for appropriate protection by the security system.

It should also be noted that most computing environments, including machine learning environments are not static. That is, various machines or components are constantly being added to, or removed from, the computer environment. As such changes are made to the computing environment, it is frequently necessary to amend or change which of the various machines or components (virtual and/or physical) are registered with the security system. Hence, in conventional approaches, and IT administrator (or similar) is required to at least periodically reassess which machines or components the IT administrator needs to register for protection with the security system. Hence, it is possible that newly added important and/or extremely relevant features of a machine learning environment are not be properly registered for appropriate protection by the security system. It is also possible that machines or components which once warranted protection by the security system, no longer require such security protection.

Thus, conventional approaches for providing security to machines or components of a computing environment, including a machine learning environment, are highly dependent upon the skill and knowledge of a system administrator. Also, conventional approaches for providing security to machines or components of a computing environment, are not acceptable in complex and frequently revised computing environments.

In conventional approaches to discovery and monitoring of services and applications in a computing environment, constant and difficult upgrading of agents is often required. Thus, conventional approaches for application and service discovery and monitoring are not acceptable in complex and frequently revised computing environments.

Additionally, many conventional security systems require every machine or component within a computing environment be assigned to a particular scope and service group so that the intended states can be derived from the service type. As the size and complexity of computing environments increases, such a requirement may require a high level system administrator to manually register as many as thousands (or many more) of the machines or components (such as, for example, virtual machines) with the security system. Thus, such conventionally mandated registration of the machines or components is not a trivial job. This burden of manual registration is made even more burdensome considering that the target users of many security systems are often experienced or very high level personnel such as, for example, Chief Information Security Officers (CISOs) and their teams who already have heavy demands on their time.

Furthermore, even such high level personnel may not have full knowledge of the network topology of the computing environment or understanding of the functionality of every machine or component within the computing environment. Hence, even when possible, the time and/or person-hours necessary to perform and complete such a conventionally required configuration for a security system can extend to days, weeks, months or even longer.

Moreover, even when such conventionally required manual registration of the various machines or components is completed, it is not uncommon that entities, including the aforementioned very high level personnel, have failed to properly assign the proper scopes and services to the various machines or components of the computing environment. Furthermore, in conventional security systems, it not uncommon to find such improper assignment of scopes and services to the various machines or components of the computing environment even after a conventional security system has been operational for years since its initial deployment. As a result, such improper assignment of the scopes and services to the various machines or components of the computing environment may have significantly and deleteriously impacted the security protection performance of conventional security systems even for a prolonged duration.

Furthermore, as stated above, most computing environments, including machine learning environments are not static. That is, various machines or components are constantly being added to, or removed from, the computing environment. As such changes are made to the computing environment, it is necessary to review the changed computing environment and once again assign the proper scopes and services to the various machines or components of the newly changed computing environment. Hence, the aforementioned overhead associated with the assignment of scopes and services to the various machines or components of the computing environment will not only occur at the initial phase when deploying a conventional security system, but such aforementioned overhead may also occur each time the computing environment is expanded, updated, or otherwise altered. This includes instances in which the computing environment is altered, for example, by is expanding, updating, or otherwise altering, for example, the roles of machine or components including, but not limited to, virtual machines of the computing environment.

BRIEF DESCRIPTION OF THE DRAWINGS

The accompanying drawings, which are incorporated in and form a part of this specification, illustrate embodiments of the present technology and, together with the description, serve to explain the principles of the present technology.

FIG. 7 is a diagram of another graphical user interface for enabling a user to interact with the present novel virtual machine (VM) search module, in accordance with an embodiment of the present invention.

Figure 1:
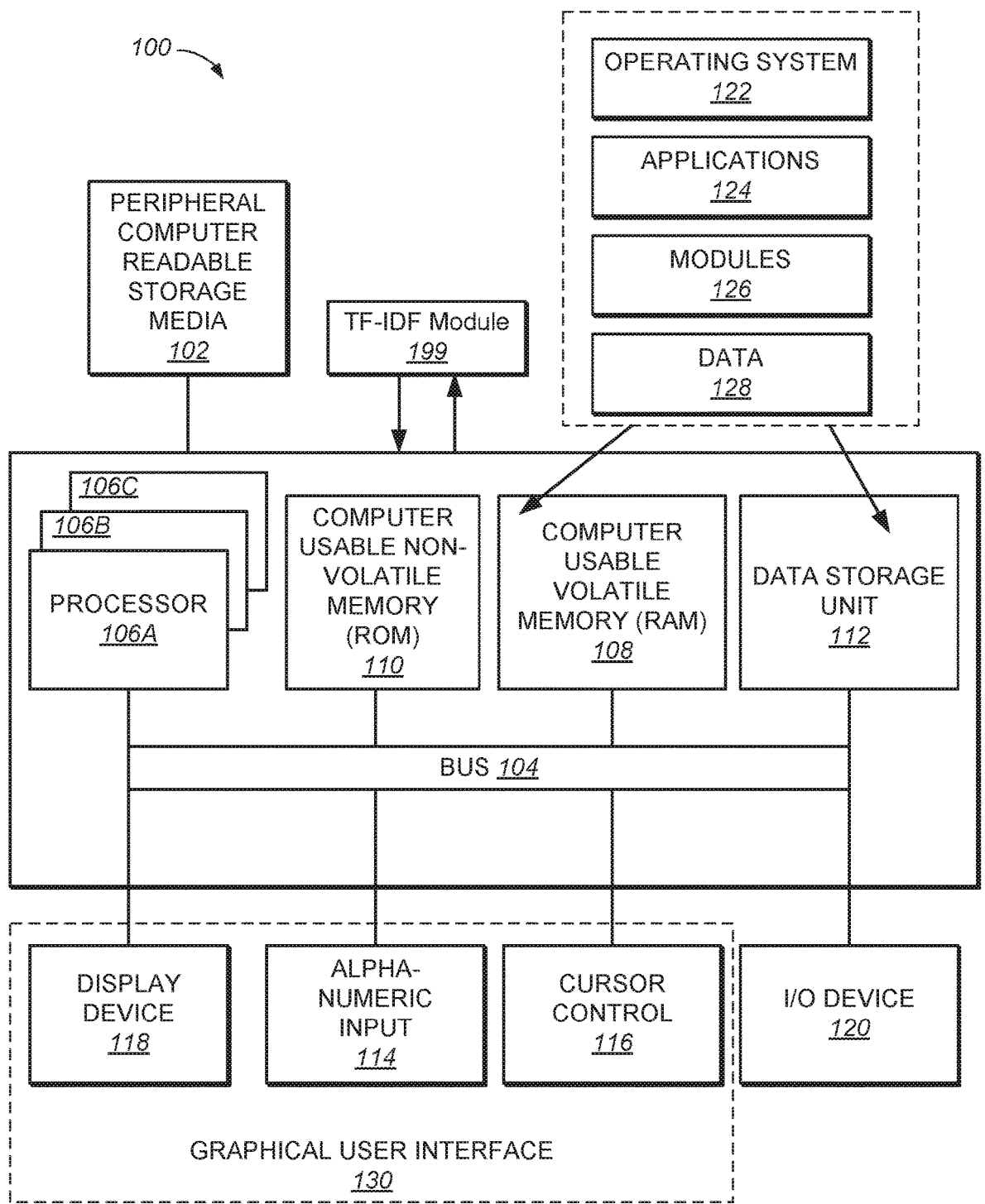
FIG. 1 shows an example computer system upon which embodiments of the present invention can be implemented, in accordance with an embodiment of the present invention.

The drawings referred to in this description should not be understood as being drawn to scale except if specifically noted.

DETAILED DESCRIPTION OF EMBODIMENTS

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Notation And Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "displaying", "identifying", "generating", "deriving", "providing," "utilizing", "determining," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. The electronic device manipulates and transforms data, represented as physical (electronic and/or magnetic) quantities within the electronic device's registers and memories, into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the Figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some embodiments, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes a cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alpha-numeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with system 100 through graphical representations presented on display device 118 by interacting with alpha-numeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Brief Overview

First, a brief overview of an embodiment of the present Feature Selection Using Term Frequency-Inverse Document Frequency (TF-IDF) Model invention, is provided below. Various embodiments of the present invention provide a method and system for automated feature selection within a machine learning environment.

More specifically, the various embodiments of the present invention provide a novel approach for automatically providing a classification for the various machines or components of a computing environment such as, for example, machine learning environment. In one embodiment, an IT administrator (or other entity such as, but not limited to, a user/company/organization etc.) registers multiple number of machines or components, such as, for example, virtual machines onto a security system platform, such as, for example, the AppDefense™ platform 804 from VMware, Inc. of Palo Alto. In the present embodiment, the IT administrator is not required to label all of the virtual machines with the corresponding service type or indicate the importance of the particular machine or component. Further, the IT administrator is not required to selectively list only those machines or components which the IT administrator feels warrant protection from the security system platform. Instead, and as will be described below in detail, in various embodiments, the present invention, will automatically determine which machines or component are to be protected by the security system.

As will also be described below, in various embodiments, the present invention is a computing module which integrated within a security system such as, for example, the AppDefense™ platform 804 of VMware, Inc. of Palo Alto. In various embodiments, the present Feature Selection Using Term Frequency-Inverse Document Frequency (TF-IDF) Model invention, will itself figure out the service type and corresponding importance of various machines or components after observing the activity by each of the machines or components for a period of time.

Importantly, for purposes and brevity and clarity, the following detailed description of the various embodiments of the present invention, will be described using an example in which the embodiments of the present Feature Selection Using Term Frequency-Inverse Document Frequency (TF-IDF) Model invention are integrated into security system, such as, but not limited to, AppDefense™ platform 804 from VMware, Inc. of Palo Alto, California. Importantly, although the description and examples herein refer to embodiments of the present invention applied to the above security system with, for example, its corresponding set of functions, it should be understood that the embodiments of the present invention are well suited to use with various other types of computer systems. Furthermore, although, for purposes of brevity and clarity, the present description and examples herein refer to AppDefense™ platform 804, it should be understood that the AppDefense™ platform 804 from VMware, Inc. of Palo Alto, California, may also be defined to include various other components, such as, but not limited to, an appliance module (AppDefense™ Appliance) 806, and an AppDefense™ MP (management plane) component 808.

Additionally, for purposes of brevity and clarity, the present application will refer to "machines or components" of a computing environment. It should be noted that for purposes of the present application, the terms "machines or components" is intended to encompass physical (e.g., hardware and software based) computing machines, physical components (such as, for example, physical modules or portions of physical computing machines) which comprise such physical computing machines, aggregations or combination of various physical computing machines, aggregations or combinations or various physical components and the like. Further, it should be noted that for purposes of the present application, the terms "machines or components" is also intended to encompass virtualized (e.g., virtual and software based) computing machines, virtual components (such as, for example, virtual modules or portions of virtual computing machines) which comprise such virtual computing machines, aggregations or combination of various virtual computing machines, aggregations or combinations or various virtual components and the like.

Additionally, for purposes of brevity and clarity, the present application will refer to machines or components of a computing environment. It should be noted that for purposes of the present application, the term "computing environment" is intended to encompass any computing environment (e.g., a plurality of coupled computing machines or components including, but not limited to, a networked plurality of computing devices, a neural network, a machine learning environment, and the like). Further, in the present application, the computing environment may be comprised of only physical computing machines, only virtualized computing machines, or, more likely, some combination of physical and virtualized computing machines.

Furthermore, again for purposes and brevity and clarity, the following description of the various embodiments of the present invention, will be described as integrated within a security system. Importantly, although the description and examples herein refer to embodiments of the present invention integrated within a security system with, for example, its corresponding set of functions, it should be understood that the embodiments of the present invention are well suited to not being integrated into a security system and operating separately from a security system. Specifically, embodiments of the present invention can be integrated into a system other than a security system. Embodiments of the present invention can operate as a stand-alone module without requiring integration into another system. In such an embodiment, results from the present invention regarding feature selection and/or the importance of various machines or components of a computing environment can then be provided as desired to a separate system or to an end user such as, for example, an IT administrator.

Importantly, the embodiments of the present Feature Selection Using Term Frequency-Inverse Document Frequency (TF-IDF) Model invention significantly extend what was previously possible with respect to providing security for machines or components of a computing environment. Various embodiments of the present Feature Selection Using Term Frequency-Inverse Document Frequency (TF-IDF) Model invention enable the improved capabilities while reducing reliance upon, for example, an IT administrator, to selectively register various machines or components of a computing environment for security protection and monitoring. This is in contrast to conventional approaches for providing security to various machines or components of a computing environment which highly dependent upon the skill and knowledge of a system administrator. Thus, embodiments of present Feature Selection Using Term Frequency-Inverse Document Frequency (TF-IDF) Model invention provide a methodology which extends well beyond what was previously known.

Also, although certain components are depicted in, for example, embodiments of the Feature Selection Using Term Frequency-Inverse Document Frequency (TF-IDF) Model invention, it should be understood that, for purposes of clarity and brevity, each of the components may themselves be comprised of numerous modules or macros which are not shown.

Procedures of the present Feature Selection Using Term Frequency-Inverse Document Frequency (TF-IDF) Model invention are performed in conjunction with various computer software and/or hardware components. It is appreciated that in some embodiments, the procedures may be performed in a different order than described above, and that some of the described procedures may not be performed, and/or that one or more additional procedures to those described may be performed. Further some procedures, in various embodiments, are carried out by one or more processors under the control of computer-readable and computer-executable instructions that are stored on non-transitory computer-readable storage media. It is further appreciated that one or more procedures of the present may be implemented in hardware, or a combination of hardware with firmware and/or software.

Hence, the embodiments of the present Feature Selection Using Term Frequency-Inverse Document Frequency (TF-IDF) Model invention greatly extend beyond conventional methods for providing security to machines or components of a computing environment. Moreover, embodiments of the present invention amount to significantly more than merely using a computer to provide conventional security measures to machines or components of a computing environment. Instead, embodiments of the present invention specifically recite a novel process, necessarily rooted in computer technology, for Feature Selection Using Term Frequency-Inverse Document Frequency (TF-IDF) Model.

Furthermore, in various embodiments of the present invention, and as will be described in detail below, a security system, such as, but not limited to, the AppDefense™ platform 804 from VMware, Inc. of Palo Alto, California will include novel security solution for a computing environment (including, but not limited to a data center comprising a virtual environment). In embodiments of the present invention, unlike conventional security systems which "chases the threats", the present security system will instead focus on monitoring the intended states of applications, machines or components of the computing environment, and the present security system will raise alarms if any anomaly behavior is detected.

Additionally, as will be described in detail below, embodiments of the present invention provide a security system including a novel search feature for machines or components (including, but not limited to, virtual machines) of the computing environment. The novel search feature of the present security system enables ends users to readily assign the proper and scopes and services the machines or components of the computing environment, Moreover, the novel search feature of the present security system enables end users to identify various machines or components (including, but not limited to, virtual machines) similar to given and/or previously identified machines or components (including, but not limited to, virtual machines) when such machines or component satisfy a particular given criteria. Hence, as will be described in detail below, in embodiments of the present security system, the novel search feature functions by finding or identifying the "siblings" of various other machines or components (including, but not limited to, virtual machines) within the computing environment.

Continued Detailed Description of Embodiments after Brief Overview

As stated above, feature selection which is also known as "variable selection", "attribute selection" and the like, is an import process of machine learning. The process of feature selection helps to determine which features are most relevant or important to use to create a machine learning model (predictive model).

In embodiments of the present invention, a security system such as, for example, the AppDefense™ platform 804 from VMware, Inc. of Palo Alto, California will utilize a Term Frequency-Inverse Document Frequency (TF-IDF) model to automatically perform the feature selection process. That is, as will be described in detail below, in embodiments of the present Feature Selection Using Term Frequency-Inverse Document Frequency (TF-IDF) Model invention, a computing module, such as, for example, TF-IDF module 199 of FIG. 1, is coupled with a computing environment. Additionally, it should be understood that in embodiments of the present Feature Selection Using Term Frequency-Inverse Document Frequency (TF-IDF) Model invention TF-IDF module 199 of FIG. 1 may be integrated with one or more of the various components of FIG. 1. TF-IDF module 199 then automatically evaluates the various machines or components of the computing environment to determine the importance of various features within the computing environment.

Several selection methodologies are currently utilized in the art of feature selection. The common selection algorithms include three classes: Filter Methods, Wrapper Methods and Embedded Methods. In Filter Methods, scores are assigned to each feature based on a statistical measurement. The features are then ranked by their scores and are either selected to be kept as relevant features or they are deemed to not be relevant features and are removed from or not included in dataset of those features defined as relevant features. One of the most popular algorithms of the Filter Methods classification is the Chi Squared Test. Algorithms in the Wrapper Methods classification consider the selection of a set of features as a search result from the best combinations. One such example from the Wrapper Methods classification is called the "recursive feature elimination" algorithm. Finally, algorithms in the Embedded Methods classification learn features while the machine learning model is being created, instead of prior to the building of the model. Examples of Embedded Method algorithms include the "LASSO" algorithm and the "Elastic Net" algorithm.

Embodiments of the present Feature Selection Using Term Frequency-Inverse Document Frequency (TF-IDF) Model invention utilize a statistic model (the TF-IDF model) to determine the importance of a particular feature within, for example, a machine learning environment.

Figure 2:
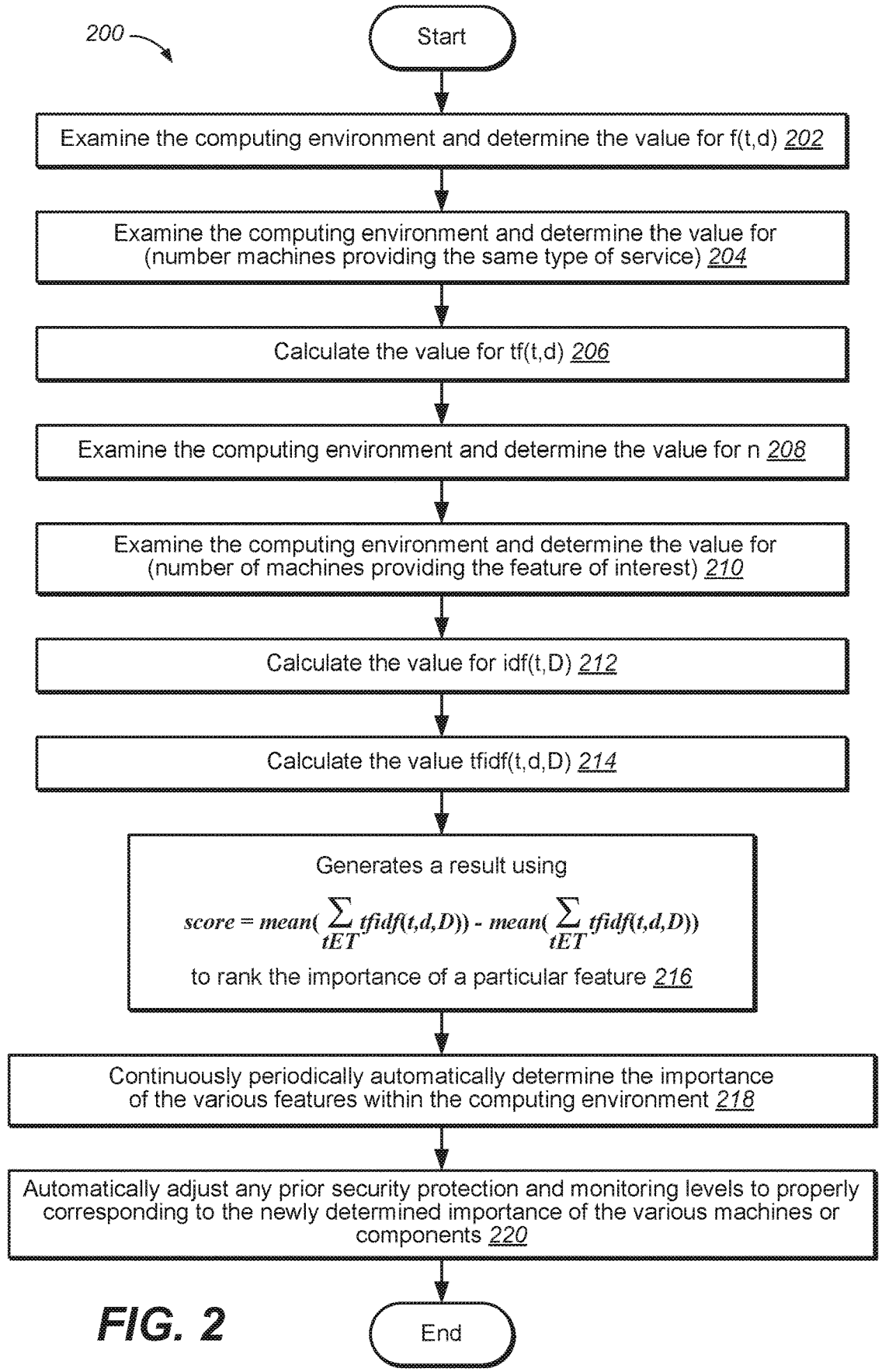
FIG. 2 is a flow chart of steps performed by the present Feature Selection Using Term Frequency-Inverse Document Frequency (TF-IDF) Model, in accordance with an embodiment of the present invention.

With reference now to FIG. 2, in embodiments of the present invention, the value of the Term Frequency (TF), within a machine learning environment is determined as follows. The value of TF for present TF-IDF model is given by the number of times a particular feature occurs across multiple machines providing a similar type of service. More specifically, the value TF, written as tf(t,d), for the present Feature Selection Using Term Frequency-Inverse Document Frequency (TF-IDF) Model invention is given by:

$$tf(t,d)=f(t,d)/(\text{number machines providing the same type of service})$$

where f(t,d) is the raw count of the number of times a feature occurs in a particular computing environment, and the term (number machines providing the same type of service) refers to the number of machines, within that same computing environment, which provide the same type of service.

Referring again to FIG. 2, in flow chart 200, as shown at 202, various embodiments of the present Feature Selection Using Term Frequency-Inverse Document Frequency (TF-IDF) Model invention examine the computing environment and determine the value for f(t,d). Embodiments of the present invention accomplish this task this by examining the computing environment and then determining the number of times a particular feature occurs within the computing environment.

With reference still to FIG. 2, as shown at 204, various embodiments of the present Feature Selection Using Term Frequency-Inverse Document Frequency (TF-IDF) Model invention again examine the computing environment and determine the value for (number machines providing the same type of service). Embodiments of the present invention accomplish this task this by examining the machines within the computing environment and then determining which of the machines within the examined computing environment provide the same type of service.

Referring again to FIG. 2, at step 206 embodiments of the present Feature Selection Using Term Frequency-Inverse Document Frequency (TF-IDF) Model invention next calculate the value for tf(t,d). Embodiments of the present invention accomplish this task this by dividing the value for f(t,d) (as derived at 202 of FIG. 2) by the value for (number machines providing the same type of service) (as derived at 204 of FIG. 2). That is, at 206, embodiments of the present Feature Selection Using Term Frequency-Inverse Document Frequency (TF-IDF) Model invention calculate the value tf(t,d) using:

$$f(t,d)/(\text{number machines providing the same type of service})$$

Referring still to FIG. 2, at 206, it will be seen that it can be seen that the value for tf(t,d) will increase proportionally to the number of times a service appears in the computing environment. Conversely, it can be seen that the value for tf(t,d) decreases by the number of machines in the computing environment which provide the same type of service. Hence, at the completion of 206, embodiments of the present Feature Selection Using Term Frequency-Inverse Document Frequency (TF-IDF) Model invention have calculated the TF portion of the present TF-IDF model.

With reference still to FIG. 2, in embodiments of the present invention, the value of the Inverse Document Frequency (IDF), within a machine learning environment is also determined as follows. The value of IDF for present TF-IDF model is given by the log of the total number of machines in the computing environment divided by the number of machines providing the feature of interest. More specifically, the value IDF, written as idf(t,D), for the present Feature Selection Using Term Frequency-Inverse Document Frequency (TF-IDF) Model invention is given by:

$$idf(t,D)=\log(N/\text{number of machines providing the feature of interest})$$

where N is the total number of machines in the computing environment, and the term (number of machines providing the feature of interest) refers to the number of machines, within that same computing environment, which provide the feature of interest.

Referring again to FIG. 2, as shown at 208, various embodiments of the present Feature Selection Using Term Frequency-Inverse Document Frequency (TF-IDF) Model invention examine the computing environment and determine the value for N. Embodiments of the present invention accomplish this task this by examining the computing environment and then determining the total number of machines within the computing environment.

With reference still to FIG. 2, as shown at 210, various embodiments of the present Feature Selection Using Term Frequency-Inverse Document Frequency (TF-IDF) Model invention again examine the computing environment and determine the value for (number of machines providing the feature of interest). Embodiments of the present invention accomplish this task this by examining the machines within the computing environment and then determining which of the machines within the examined computing environment provide the feature of interest.

Referring again to FIG. 2, at step 212 embodiments of the present Feature Selection Using Term Frequency-Inverse Document Frequency (TF-IDF) Model invention next calculate the value for idf(t,D). Embodiments of the present invention accomplish this task this by dividing the value for N (as derived at 208 of FIG. 2) by the value for (number of machines providing the feature of interest) (as derived at 210 of FIG. 2) and taking the log of the result. That is, at 212, embodiments of the present Feature Selection Using Term Frequency-Inverse Document Frequency (TF-IDF) Model invention calculate the value idf(t,D) using:

log(N/number of machines providing the feature of interest)

Referring still to FIG. 2, it will be seen that at the completion of 212, embodiments of the present Feature Selection Using Term Frequency-Inverse Document Frequency (TF-IDF) Model invention have calculated the IDF portion of the present TF-IDF model.

With reference still to FIG. 2, it should be noted that in embodiments of the present Feature Selection Using Term Frequency-Inverse Document Frequency (TF-IDF) Model invention, the TF-IDF model is the product of two parts. That is, in embodiments of the present Feature Selection Using Term Frequency-Inverse Document Frequency (TF-IDF) Model invention the TF-IDF model is comprised of the TF portion (tf(t,d) as determined above at 202-206 of FIG. 2) multiplied by the IDF portion (idf(t,D) as determined above at 208-2012 of FIG. 2). That is, at 214, embodiments of the present Feature Selection Using Term Frequency-Inverse Document Frequency (TF-IDF) Model invention calculate the value tfidf(t,d,D) using:

tf(t,d)*idf(t,D)

Referring still to FIG. 2, it will be seen that at the completion of 214, embodiments of the present Feature Selection Using Term Frequency-Inverse Document Frequency (TF-IDF) Model invention have calculated the entire TF-IDF value corresponding to the present TF-IDF model. In some embodiments, results from the above-described Feature Selection Using Term Frequency-Inverse Document Frequency (TF-IDF) Model invention process are stored, for example, in database 824 of FIG. 8. Furthermore, in various embodiments, database 824, which stores the results of the above-described Feature Selection Using Term Frequency-Inverse Document Frequency (TF-IDF) Model invention process, may be separate from or integrated into novel VM search module 802.

Hence, in various embodiments of the present Feature Selection Using Term Frequency-Inverse Document Frequency (TF-IDF) Model invention, the result of the TF-IDF model is used to evaluate the importance of a particular feature to a class of services.

In various embodiments, the present Feature Selection Using Term Frequency-Inverse Document Frequency (TF-IDF) Model invention will extend the TF-IDF to sum the tfidf values of the same feature across all the machines with the computing environment which provide the same service.

In one such embodiment, if it is assumed that N number of machines in the computing environment each provide one kind of service. Further assume, that all of the structured query language (SQL) servers are in group n1. Also assume that all the domain controller servers are in group n2. Further assume that all of the exchange servers are in group n3. In order to perform the present TF-IDF analysis for any features of the SQL servers, embodiments of the present invention will compute the tfidf score of each feature on every machine inside group n1. Next, in such an embodiment, the present invention would sum the scores across those servers of group n1, and rank each feature based on the mean value determined. It should further be noted that in various embodiments of the present invention, when computing the tfidf score by individual machine within the computing environment, the N value is given by all machines in the computing environment, not only the machines of a particular group (n1, n2, n3, etc.).

In one such embodiment of the present Feature Selection Using Term Frequency-Inverse Document Frequency (TF-IDF) Model invention, it is noted that the summation of tfidf scores only inside the targeted class of service may not provide the best performance. More specifically, in some embodiments of the present Feature Selection Using Term Frequency-Inverse Document Frequency (TF-IDF) Model invention, it is possible that one feature may receive a high score for the targeted type of service, but that same service may also receive a high score outside to the class of interest. As a result, in various embodiments of the present Feature Selection Using Term Frequency-Inverse Document Frequency (TF-IDF) Model invention, the features are method actually ranked based on the results of the difference between the mean tfidf result of for target class and the tfidf result of a non-target class.

In one such embodiment, as shown at 216 of FIG. 2, the present Feature Selection Using Term Frequency-Inverse Document Frequency (TF-IDF) Model invention generates a result as follows:

score=mean($\Sigma_{t \in T}$tfidf(t, d, D))−mean($\Sigma_{t \notin T}$tfidf(t, d, D))

In such an embodiment, the present Feature Selection Using Term Frequency-Inverse Document Frequency (TF-IDF) Model invention can rank the importance of a particular feature based upon the received score.

Thus, embodiments of the present Feature Selection Using Term Frequency-Inverse Document Frequency (TF-IDF) Model invention achieve automated feature selection within a machine learning environment.

More specifically, the various embodiments of the present invention provide a novel approach for automatically providing a classification for the various machines or components of a computing environment such as, for example, machine learning environment. Further, unlike conventional approaches, in embodiments of the present Feature Selection Using Term Frequency-Inverse Document Frequency (TF-IDF) Model invention, the IT administrator is not required to label all of the virtual machines with the corresponding service type or indicate the importance of the particular machine or component. Further, the IT administrator is not required to selectively list only those machines or components which the IT administrator feels warrant protection from the security system platform. Instead, the present Feature Selection Using Term Frequency-Inverse Document Frequency (TF-IDF) Model invention, will automatically determine the importance of the various features within the computing environment as explicitly described above in conjunction with the discussion of FIGS. 1 and 2.

Figure 3:
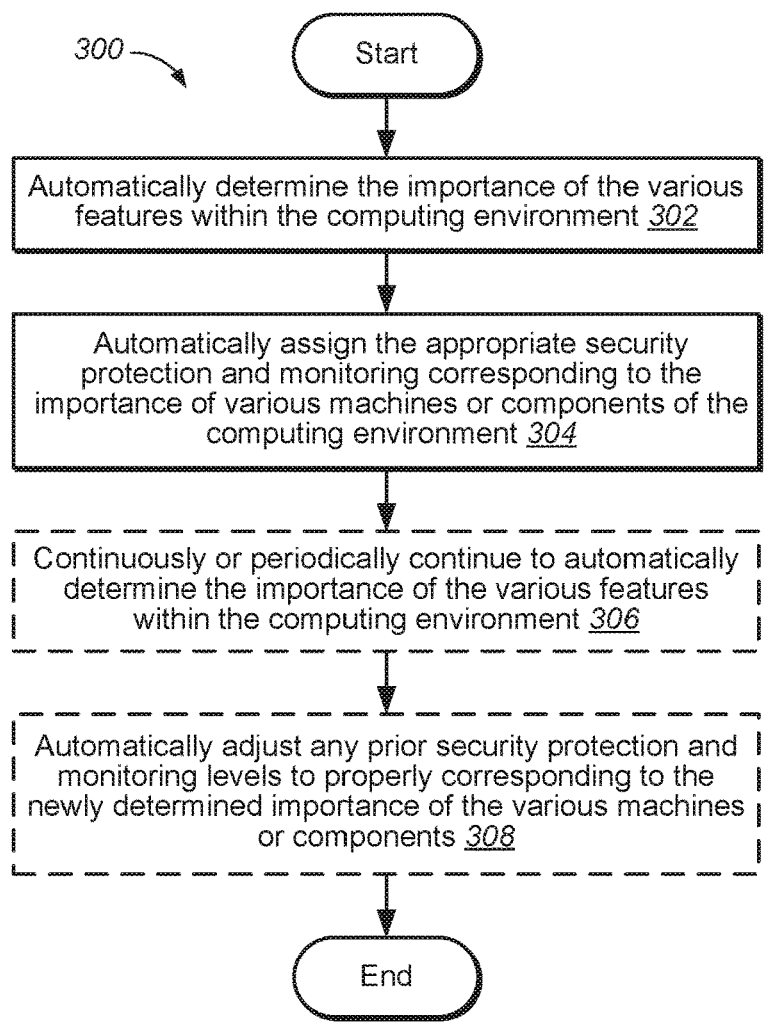
FIG. 3 is a flow chart of steps performed by the present Feature Selection Using Term Frequency-Inverse Document Frequency (TF-IDF) Model, wherein a security system utilizes results from the TF-IDF model to determine which features of a computing environment to protect, in accordance with an embodiment of the present invention.

With reference now to FIG. 3, in one embodiment of the present invention, the automatically derived feature selection results (as described in FIG. 2) are then used by a security system to determine the appropriate level of security protection and monitoring for the various machines or components corresponding to the features of the computing environment. In one embodiment, for example, where the present TF-IDF model determined that a feature is highly ranked (e.g., very important/very relevant) the security system will then automatically (without requiring the intervention of an IT administrator) assign security protection and monitoring to the machines or components corresponding to the highly ranked feature. Conversely, in one embodiment, for example, where the present TF-IDF model determined that a feature is not highly ranked (e.g., not very important/ not very relevant) the security system will then automatically (without requiring the intervention of an IT administrator) not assign security protection and monitoring (or, for example, assign a lower level of security protection and monitoring) to the machines or components corresponding to the not highly ranked feature. Hence, in various embodiments, the present Feature Selection Using Term Frequency-Inverse Document Frequency (TF-IDF) Model invention, will itself first automatically perform feature selection and then automatically assign the appropriate security protection and monitoring corresponding to the importance of various machines or components of the computing environment after observing the activity by each of the machines or components for a period of time.

Further, in various embodiments of the present Feature Selection Using Term Frequency-Inverse Document Frequency (TF-IDF) Model invention, as shown at optional 218 of FIG. 2, the embodiments will either continuously or periodically continue to automatically determine the importance of the various features within the computing environment as explicitly described above in conjunction with the discussion of FIGS. 1 and 2. Thus, as any changes are made to the structure (e.g., the machines or components) or the functions (e.g., the operations of the various machines or components) within the computing environment, the present Feature Selection Using Term Frequency-Inverse Document Frequency (TF-IDF) Model invention will generate an updated classification or ranking for the features of the computing environment. Further, in some such embodiments, as shown at optional 220 of FIG. 2, the present Feature Selection Using Term Frequency-Inverse Document Frequency (TF-IDF) Model invention, will itself then automatically adjust any prior security protection and monitoring levels to properly corresponding to the newly determined importance of the various machines or components. Hence, unlike conventional approaches for providing security to machines or components of a computing environment, which are not acceptable in complex and frequently revised computing environments, embodiments of the present Feature Selection Using Term Frequency-Inverse Document Frequency (TF-IDF) Model invention are well suited to use in complex and frequently revised computing environments.

Referring now to flow chart 300 of FIG. 3, as shown at 302 embodiments of the present Feature Selection Using Term Frequency-Inverse Document Frequency (TF-IDF) Model invention automatically determine the importance of the various features within the computing environment.

Referring next to 304, in some embodiments of the present Feature Selection Using Term Frequency-Inverse Document Frequency (TF-IDF) Model invention, the results from 302 of Figure are then used by a security system such as for example, the AppDefense™ platform 804 of VMware, Inc developed by VMware, Inc. of Palo Alto, California to automatically assign the appropriate security protection and monitoring corresponding to the importance of various machines or components of the computing environment.

Further, in various embodiments of the present Feature Selection Using Term Frequency-Inverse Document Frequency (TF-IDF) Model invention, as shown at optional 306 of FIG. 3, the embodiments will either continuously or periodically continue to automatically determine the importance of the various features within the computing environment as explicitly described above in conjunction with the discussion of FIGS. 1 and 2.

Additionally, in some such embodiments, as shown at optional 308 of FIG. 3, the present Feature Selection Using Term Frequency-Inverse Document Frequency (TF-IDF) Model invention, will itself then automatically adjust any prior security protection and monitoring levels to properly corresponding to the newly determined importance of the various machines or components.

Once again, although various embodiments of the present Feature Selection Using Term Frequency-Inverse Document Frequency (TF-IDF) Model invention described herein refer to embodiments of the present invention integrated within a security system with, for example, its corresponding set of functions, it should be understood that the embodiments of the present invention are well suited to not being integrated into a security system and operating separately from a security system. Specifically, embodiments of the present invention can be integrated into a system other than a security system. Embodiments of the present invention can operate as a stand-alone module without requiring integration into another system. In such an embodiment, results from the present invention regarding feature selection and/or the importance of various machines or components of a computing environment can then be provided as desired to a separate system or to an end user such as, for example, an IT administrator.

Figure 4:
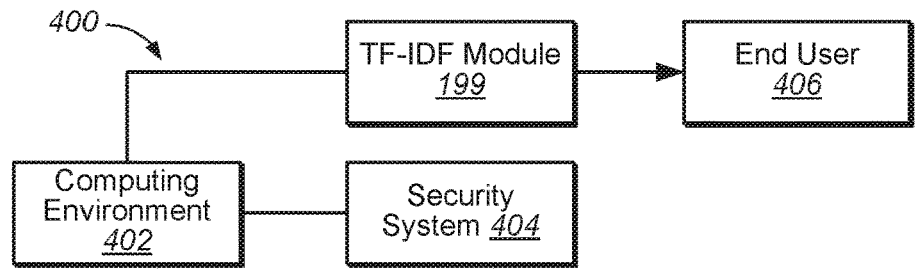
FIG. 4 is a schematic representation of a system in which a security system is configured to receive results from a TF-IDF module to determine which features of a computing environment to protect, in accordance with an embodiment of the present invention.

With reference next to FIG. 4, a schematic diagram of a system 400 is provided. In FIG. 4, a computing environment 402 is coupled to the present TF-IDF module 199. In the embodiment of FIG. 4, TF-IDF module 199 is not integrated with security system 404. In such an embodiment of the present Feature Selection Using Term Frequency-Inverse Document Frequency (TF-IDF) Model invention, TF-IDF module 199 operates as a stand-alone module without requiring integration into, for example, security system 404. In one such embodiment, results from the present Feature Selection Using Term Frequency-Inverse Document Frequency (TF-IDF) Model invention, regarding feature selection and/or the importance of various machines or components of a computing environment, are provided, for example, to a separate system or to an end user such as, for example, end user 406. In one such embodiment, end user 406 will, for example, use the results from TF-IDF module 199 to manually assign the appropriate security protection and monitoring (which is then applied, for example, by a security system such as, for example, security system 404) corresponding to the importance of various machines or components of computing environment 402.

Figure 5:
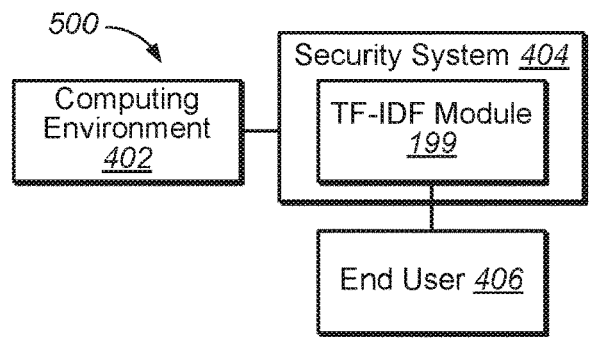
FIG. 5 is a schematic representation of a system in which a security system is configured to receive results from a TF-IDF module, integrated with the security system, to determine which features of a computing environment to protect, in accordance with an embodiment of the present invention.

With reference now to FIG. 5, a schematic diagram of a system 500 is provided. In FIG. 5, a computing environment 402 is coupled to the present TF-IDF module 199. In the embodiment of FIG. 5, TF-IDF module 199 is integrated with security system 404 such as, for example, the AppDefense™ platform 804 of VMware, Inc developed by VMware, Inc. of Palo Alto, California. In such an embodiment of the present Feature Selection Using Term Frequency-Inverse Document Frequency (TF-IDF) Model invention, TF-IDF module 199 operates as an integrated portion of, for example, security system 404. In one such embodiment, results from the present Feature Selection Using Term Frequency-Inverse Document Frequency (TF-IDF) Model invention, regarding feature selection and/or the importance of various machines or components of a computing environment, are automatically provided to system or to an end user such as, for example, end user 406. In one such embodiment, end user 406 will, for example, use the results from TF-IDF module 199 to manually assign the appropriate security protection and monitoring (which is then applied, for example, by a security system such as, for example, security system 404) corresponding to the importance of various machines or components of computing environment 402. In one embodiment, the operations of present Feature Selection Using Term Frequency-Inverse Document Frequency (TF-IDF) Model invention are performed, for example, by feature selection module 812 of FIG. 8.

Referring still to FIG. 5, in another embodiment of the present Feature Selection Using Term Frequency-Inverse Document Frequency (TF-IDF) Model invention, TF-IDF module 199 again operates as an integrated portion of, for example, security system 404. In one such embodiment, results from the present Feature Selection Using Term Frequency-Inverse Document Frequency (TF-IDF) Model invention, regarding feature selection and/or the importance of various machines or components of a computing environment, are automatically provided to security system 404 without requiring any intervention by an end user (such as end user 406). In one such embodiment, security system 404, will automatically use the results from TF-IDF module 199 and automatically and autonomously assign the appropriate security protection and monitoring to the various machines or components of computing environment 402 as necessitated by the corresponding importance of the various machines or components of computing environment 402.

Importantly, the embodiments of the present Feature Selection Using Term Frequency-Inverse Document Frequency (TF-IDF) Model invention significantly extend what was previously possible with respect to providing security for machines or components of a computing environment. Various embodiments of the present Feature Selection Using Term Frequency-Inverse Document Frequency (TF-IDF) Model invention enable the improved capabilities while reducing reliance upon, for example, an IT administrator, to selectively register various machines or components of a computing environment for security protection and monitoring. This is in contrast to conventional approaches for providing security to various machines or components of a computing environment which highly dependent upon the skill and knowledge of a system administrator. Furthermore, embodiments of the present Feature Selection Using Term Frequency-Inverse Document Frequency (TF-IDF) Model invention utilize a novel feature selection methodology, including the TF-IDF analysis, for feature selection and importance determination for features and corresponding machines or components of a computing environment. Even further, embodiments of the present Feature Selection Using Term Frequency-Inverse Document Frequency (TF-IDF) Model invention utilize the above-mentioned novel feature selection methodology in an automated manner and then various embodiments also automatically (e.g., without requiring intervention of an IT administrator) apply, via a security system, appropriate monitoring and protection to the various features (and corresponding machines or components) of the computer environment. Thus, embodiments of present Feature Selection Using Term Frequency-Inverse Document Frequency (TF-IDF) Model invention provide a methodology which greatly and non-obviously extends well beyond what was previously known.

Hence, the embodiments of the present Feature Selection Using Term Frequency-Inverse Document Frequency (TF-IDF) Model invention greatly extend beyond conventional methods for performing feature selection within a computing environment. Moreover, embodiments of the present invention amount to significantly more than merely using a computer to provide conventional security measures to machines or components of a computing environment. Instead, embodiments of the present invention specifically recite a novel process, necessarily rooted in computer technology, for automated Feature Selection Using Term Frequency-Inverse Document Frequency (TF-IDF) Model.

Additionally, embodiments of the present Feature Selection Using Term Frequency-Inverse Document Frequency (TF-IDF) Model invention greatly extend beyond conventional methods for providing security to machines or components of a computing environment. That is, embodiments of the present invention amount to significantly more than merely using a computer to provide conventional security measures to machines or components of a computing environment. Instead, embodiments of the present invention specifically recite a novel process, necessarily rooted in computer technology, for automated Feature Selection Using Term Frequency-Inverse Document Frequency (TF-IDF) Model, and then using the results of the TF-IDF model to automatically assign appropriate security measures to the various machines or components of a computing environment.

In various embodiments, the present Feature Selection Using Term Frequency-Inverse Document Frequency (TF-IDF) Model invention automatically provides feature selection information. In so doing, the present embodiments enable improved security monitoring for the various machines or components of a computing environment. Thus, embodiments of the present invention teach novel approaches for using a computer to overcome a problem specifically arising in the computer-based realm of providing security to various machines or components of a computing environment, such as, for example, a machine learning environment.

It should be noted that worldwide IT security spending has recently reached $114 billion and will continue to expand to $124 billion in 2019. During the same period, when examining machines or components of computing environments, the number of virtual machines in the world has increased dramatically. In various embodiments, the present security system is well suited to tackling security problems associated with virtual machines. For example, in one embodiment as found, for example, in the AppDefense™ platform 804 of VMware, Inc developed by VMware, Inc. of Palo Alto, California, embodiments of the present security system provides a security solution for computing environments comprising, but not limited to, a data center endpoint security solution for applications running in virtualized environments.

Figure 6:
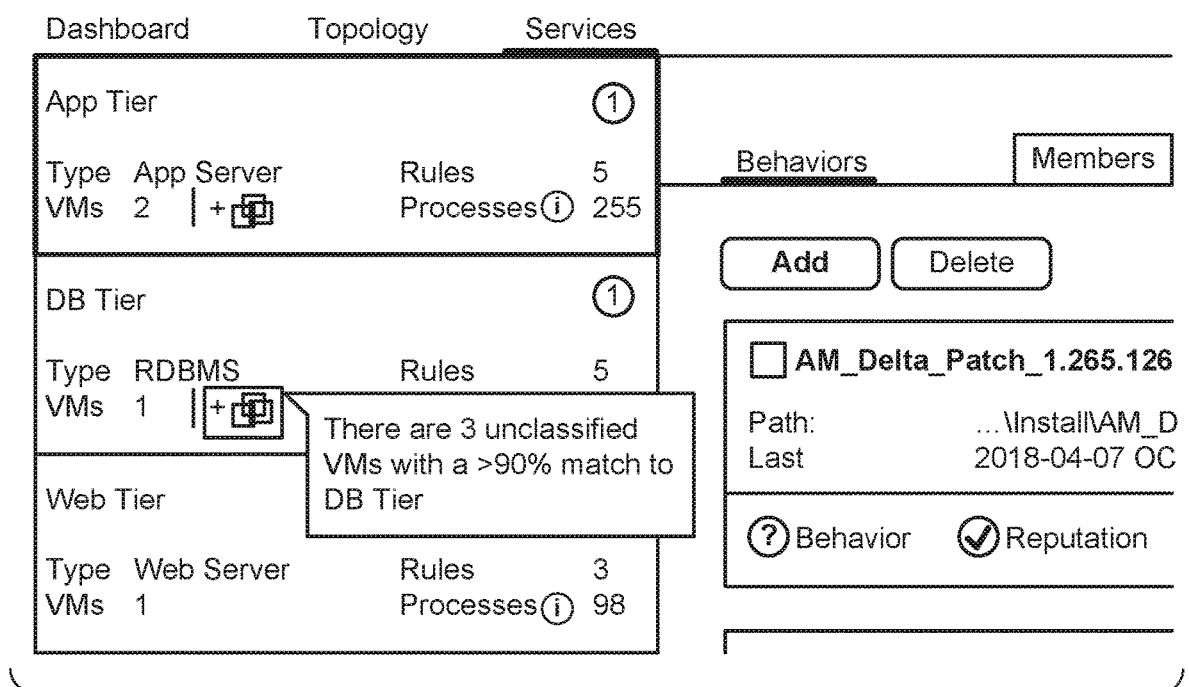
FIG. 6 is a diagram of a graphical user interface for enabling a user to interact with the present novel virtual machine (VM) search module, in accordance with an embodiment of the present invention.

With reference now to FIG. 6 and FIG. 7, graphical user interfaces 600 and 700, respectively, of one embodiment of the present security system are provided. As depicted in FIG. 6 and FIG. 7, in one embodiment, the present security system such as, for example as depicted at 800 of FIG. 8, when provided (for example by a user of the present security system) with a particular type of service, the present security system will examine the computing environment of interest and then recommend a particular machine or component (including, but not limited to a virtual machine(s)) within the computing environment which matches the particular type of service.

Referring still for FIG. 6 and FIG. 7, in one embodiment of the present security system, a user is presented with a list of services. In embodiments of the present security system, when a user graphically hovers over the "candidates" icon pertaining to a particular service, the user interface of the present security system informs the user of the number of unclassified machines or components (including, but not limited to, virtual machines) that match the particular service. Next, in embodiments of the present security system, provided that the user selects the "ADD" button, the present security system, via the graphical user interface of FIG. 6 and FIG. 7, will present the user with the top matched machines or components (including, but not limited to, virtual machines) within the computing environment using, for example, a popup window as shown in graphical user interface 700 of FIG. 7.

Referring still to FIG. 6 and FIG. 7, in embodiments of the present security system, in addition to identifying the machines or components (including, but not limited to virtual machines) of the computing environment, the present security system (as will be described in detail below) will also provide the user with information regarding machines or components of the computing environment which have similar scores and/or reasonings. In so doing, and as will be described in detail below, embodiments of the present security system also enable users to select those machines or components of the computing environment which have similar scores and/or reasonings and thereby assign such machines or components of the computing environment to the particular service.

Figure 8:
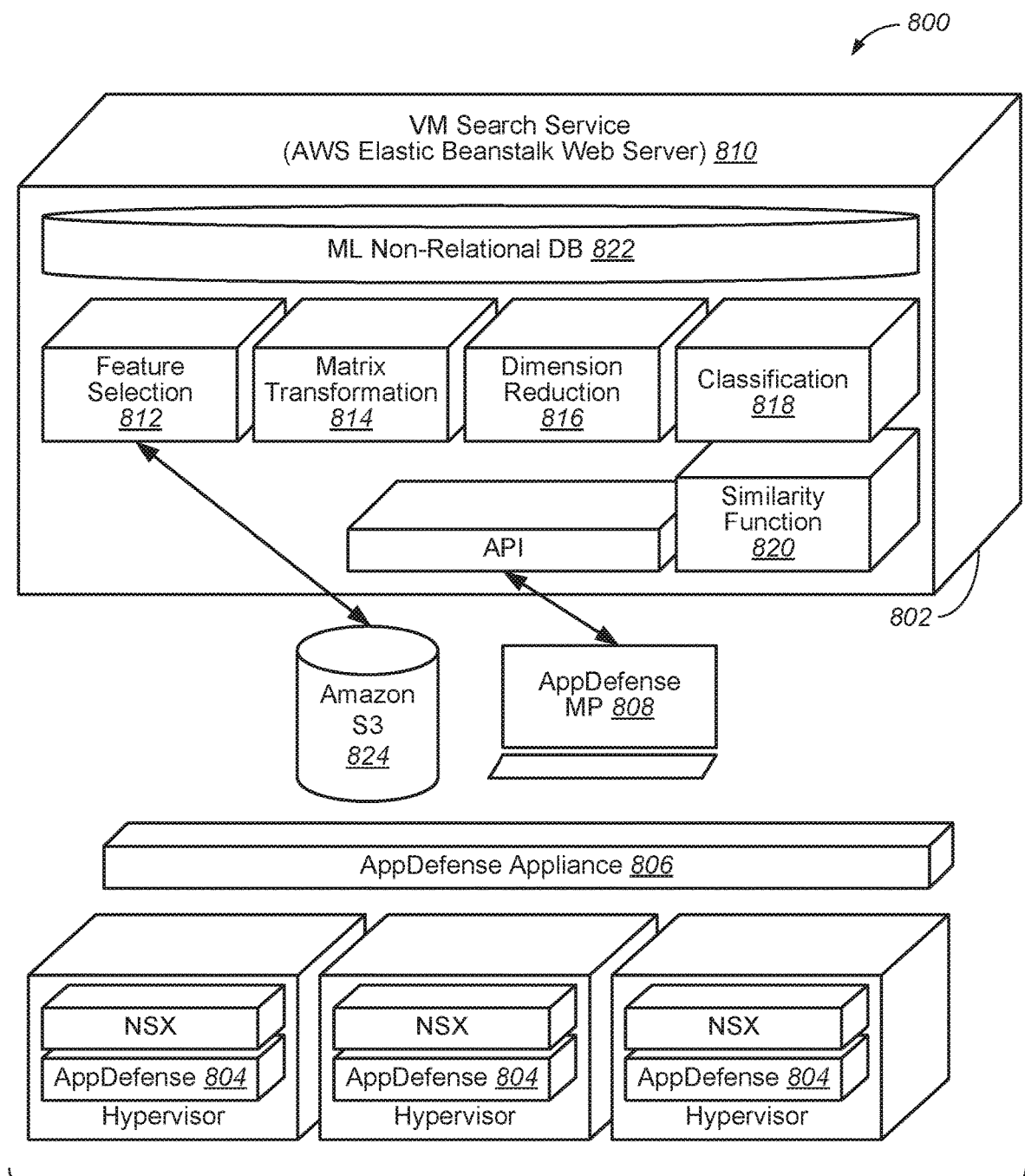
FIG. 8 is a schematic diagram of an embodiment of the present novel virtual machine (VM) search module integrated with a security system, in accordance with an embodiment of the present invention.

Referring now to FIG. 8, a schematic diagram 800 of an embodiment of the present invention integrated with a security system is provided. As will be discussed below, it should be noted that in various embodiments, novel aspects of the present security system may be integrated into a complete security system. In various other embodiments, novel aspects of the present security system may exist as a separate component or module. In one such embodiment, the separate component or module will operate, for example, as a server, which runs independently from the main component of, for example, a legacy or conventional security system.

With reference still to FIG. 8, in various embodiments of the present invention, at the backend of schematic diagram 800, novel aspects of the present invention such as, for example, a VM search module runs as a server independently from the main component of a security system such as, but not limited to, the AppDefense™ platform 804 of VMware, Inc developed by VMware, Inc. of Palo Alto, California. In such an embodiment, the novel aspects of the present invention run independently from the main component of a security system because the novel component, such as the VM search module 802 (also referred to as a VM Search Service) uses Machine Learning (ML) techniques which heavily rely on data processing, data mining and advanced computations such as matrix operations. Hence, the computational requirements of the VM search module 802 are quite different from the computational requirements of the overall security system such as, but not limited to, the AppDefense™ platform 804 of VMware, Inc developed by VMware, Inc. of Palo Alto, California. It should be noted that for purposes of brevity and clarity, the abbreviation VM is used herein to refer to the term "virtual machine". It should be noted, however, that the various embodiments of the present invention are not limited solely to use with virtual machines, but, instead, the various embodiments of the present invention are well suited to use with various other machines or components (including, but not limited to, virtual machines) within a computing environment.

Additionally, in various embodiments of the present invention, by having the novel aspects of the present invention run independently from the main component of a security system, embodiments of the present invention enable engineers working on the novel VM search module 802 to have different skill sets than the skill sets of the traditional application developers who typically work on conventional security systems. As yet another advantage of embodiments of the present invention, in which the novel VM search module 802 runs separately from the security system, the separately operating novel VM search module 802 has reduced interference with the functions of the conventional security system.

Referring still to FIG. 8, in one embodiment, the present VM search module sits on an individual web server such as, but not limited to, for example, an AWS Elastic Beanstalk™ web server 810 of Amazon.com, Inc of Seattle, Washington. In one such embodiment as depicted in FIG. 8, novel aspects of the present invention are located in the same virtual private cloud (VPC) network as the management plane of the conventional security system (for example, but not limited to, the management plane (MP) 808 of the AppDefense™ platform 804 of VMware, Inc developed by VMware, Inc. of Palo Alto, California. As a result, in various embodiments of the present invention, novel aspects of the present security system, such as the VM search module are able to readily access the relational database service of the conventional security system. Furthermore, in such an embodiment of the present invention, the MP 808 can also access the application program interfaces (APIs) provided by the present VM search module.

With reference still to FIG. 8, embodiments of the present invention also install an agent on each hypervisor. In such an embodiment, the agent collects signals pertaining to, for example, process information, network ports, and the like, from the data plane, and the agent then uploads the signals to the relational database service on the web server.

Referring still to the FIG. 8, in various embodiments of the present invention the novel VM search module 802 also requests data from the database, and uses a TF-IDF feature selection analysis to determine the critical features of every scope and service. In various embodiments, the present TF-IDF feature selection analysis is performed, for example, by feature selection module 812 of FIG. 8. Furthermore, in various embodiments, feature selection module 812 comprises a portion of novel VM search module 802. The TF-IDF feature selection analysis is described in detail above in conjunction with the discussion of FIG. 1 through FIG. 5.

In addition to the above detailed description of the TF-IDF feature selection analysis provided in FIGS. 1-5, in various embodiments of the present invention, the TF-IDF feature selection may also be described as follows. The TF-IDF feature selection analysis is, in one embodiment, the product of two parts as shown below at equation (1).

$$tf\text{-}idf(w, d, C) = tf(w, d) * idf(w, d, C) \quad (1)$$

In various embodiments of the present invention, for the novel VM search module 802, w is the target feature, d is the VM of interest, C is all the VMs in the computing environment (also referred to as the system). Although, there are various ways to compute the value of tf, in one embodiment of the present invention, a basic term frequency adjusted method is utilized and can be depicted as shown below at equation (2).

$$tf(w, d) = \frac{f(w, d)}{\Sigma_w f(w, d)} \quad (2)$$

where f(w; d) is the raw count of feature w in VM d.

As mentioned above, the idf portion of the present TF-IDF feature selection analysis is a measure of how much information the feature provides and can be depicted as shown below at equation (3).

$$idf(w, d, C) = \log_2\left(\frac{N}{\Sigma_{d: \exists w \in d}^{C} 1}\right) \quad (3)$$

where N is the number of features. The final tf-idf gives more weight to a feature which appears often in the VM but also, at the same time, reduces the weight if the same feature appears in multiple VMs which indicates that the feature has less value to identify a VM.

In various embodiments of the present invention, the TF-IDF feature selection analysis is directly used to find VMs matching a given VM. To find VMs for a given service, the present TF-IDF feature selection analysis is extended.

An intuitive way to extend the present TF-IDF feature selection analysis is to sum the tf-idf values of all the VMs from the same service. For example, assume that we are given n number of VMs from three types of services: SQL, Domain Controller, and Exchange Servers. In order to find the proper features for SQL, the present TF-IDF feature selection analysis computes the tf-idf value of each feature from all VMs known to be SQL servers. However, since the summation is affected by the group size, the present TF-IDF feature selection analysis uses the mean instead. The final equation can be depicted as shown below at equation (4).

$$score = mean\ (\Sigma_{d \in C_1} tf\text{-}idf(w, d, C)) - mean\ (\Sigma_{d \notin C_1} tf\text{-}idf(w, d, C)) \quad (4)$$

where, in equation 4, C1 sets the range for VMs labeled by the target service. To reduce the impact of VMs not from the target service, in the present TF-IDF feature selection analysis, the final score is the difference between the mean value obtained within the target service and the value obtained outside.

In various embodiments of the present invention, after the above-described TF-IDF feature selection analysis, the novel VM search module 802 of the present embodiment computes the weight score for each feature accordingly to the TF-IDF feature selection analysis, and saves the results in the local machine learning (ML) database. Also, in some embodiments, the above-mentioned local machine learning (ML) database is comprised, for example, of ML non-relational database (DB) 822 of FIG. 8. Furthermore, in various embodiments, ML non-relational database (DB) 822, which receives results, comprises a portion of novel VM search module 802. Additionally, as described above in conjunction with the discussion of FIGS. 1-5, in various embodiments of the present invention, the results derived from the present TF-IDF feature selection analysis are periodically updated.

In various embodiments of the present invention, in the novel VM search module 802 of the present embodiment, the values of the selected features from all unclassified VMs are set as input into a matrix transformation process. The contents are transformed into a matrix of weights in which the rows correspond to the features, while the columns of the matrix correspond to the VMs. In various embodiments, the present matrix transformation process is performed, for example, by matrix transformation module 814 of FIG. 8. Furthermore, in various embodiments, matrix transformation module 814 comprises a portion of novel VM search module 802.

Additionally, in various embodiments, the novel VM search module 802 of the present embodiment implements two models: TF-IDF based (as described above) and entropy-based. The entropy-based model uses a weight function which can be depicted as shown below at equation (5).

$$weight = \frac{f(w, d)}{\Sigma_w f(w, d)} * \left(1 - \frac{h(d|i)}{h(d)}\right) \quad (5)$$

where, in equation (5), the first part, referred to as feature frequency, is the same as the one used in equation (2). Further, in the novel VM search module 802 of the present embodiment, h(d) is the entropy of the VM distribution and h(dji) is the entropy of the conditional distribution on feature i. In various embodiments of the present invention, in the novel VM search module 802 of the present embodiment, the output in matrix format is used for a similarity calculation as is described below. As stated above, in various embodiments, the present entropy-based model process is performed, for example, by feature selection module 812 of FIG. 8. Furthermore, in various embodiments, feature selection module 812, which performs the entropy-based model process, comprises a portion of novel VM search module 802.

Referring again to FIG. 8, in various embodiments of the present invention, when a search request is sent, for example, from a user involves a large number of machines or components or features (including, but not limited to virtual machines) within the computing environment, there is a possibility that the computational cost associated with the search is high. Under such circumstances, various embodiments of the present invention employ dimension reduction (also referred to as "dimensionality reduction") in order to reduce the computational cost and reduce system response time. Such dimension reduction is described in detail below. Also, in some embodiments, the present dimension reduction process is performed, for example, by dimension reduction module 816 of FIG. 8. Furthermore, in various embodiments, dimension reduction module 816, which performs the dimension reduction process, comprises a portion of novel VM search module 802.

Still referring to FIG. 8, additionally, various embodiments of the present invention, utilize a Cosine similarity process in the ranking of the returned search results. The Cosine similarity process, as utilized in embodiments of the present invention, is described in detail below. In such embodiments of the present invention, the results are returned, for example, in a JavaScript Object Notation (JSON) format to the user of the present invention. During such a procedure, and in accordance with various embodiments of the present invention, the local machine learning (ML) database is used to store intermittent results so that components of the present invention, and the entire security system, can work asynchronously from other components. Also, in some embodiments, the above-described Cosine similarity process is performed, for example, by similarity function module 820 of FIG. 8. Furthermore, in various embodiments, similarity function module 820, which performs the Cosine similarity process, comprises a portion of novel VM search module 802.

Additionally, in various embodiments of the present invention, when many of the types of services are well-defined, the various embodiments of the present invention will utilize a classification process to replace the Cosine similarity process. The classification process, as utilized in embodiments of the present invention, is described in detail below. As stated above, in various embodiments, the present classification process is performed, for example, by classification module 818 of FIG. 8. Furthermore, in various embodiments, classification module 818, which performs the classification process, comprises a portion of novel VM search module 802.

As stated above, in various embodiments, the present entropy-based model process is performed, for example, by feature selection module 812 of FIG. 8. Furthermore, in various embodiments, feature selection module 812, which performs the entropy-based model process, comprises a portion of novel VM search module 802.

As stated above, in various embodiments of the present invention, when the number of unclassified VM candidates is large as well as the number of features, to be more efficient, to reduce system response time and eliminate noise, a dimensionality reduction process is introduced. In one embodiment, the novel VM search module 802 of the present invention implements Singular Value Decomposition (SVD) to reduce the size of the matrix transformation output. SVD is expressed in the as provided below in equation (6).

$$M = U\Sigma V^* \quad (6)$$

where, in equation (6), M is a m×n matrix, U is an m×m unitary matrix, Σ is a diagonal m×n matrix with only non-negative real numbers, V is a n×n unitary matrix, and V* is the conjugate transpose of V The diagonal entries $\sigma_i$ of Σ are known as the singular values of M. In various embodiments of the present invention, by listing the singular values in descending order, dimensionality reduction is achieved by simply dropping rows. The result, in various embodiments of the present invention, is a compressed version of the original weight matrix with a smaller number of rows. Once again, in some embodiments, the above-described dimension reduction process is performed, for example, by dimension reduction module 816 of FIG. 8. Furthermore, in various embodiments, dimension reduction module 816, which performs the above-described dimension reduction process, comprises a portion of novel VM search module 802.

In various embodiments of the present invention, another process performed by the novel VM search module 802 of the present embodiment is to rank all of the unclassified VMs based on the similarity score. As stated above, various embodiments of the present invention, utilize a Cosine similarity process in the ranking of the returned search results. More specifically, some embodiments of the present invention achieve the ranking utilizing a Cosine similarity function and comparing every VM to the given VM (also referred to as "VM to VM matching"). In various other embodiments of the present invention, the present novel VM search module 802 achieves the ranking utilizing a Cosine similarity function and comparing every VM to a synthetic VM (e.g., when a service is given). Such embodiments of the present invention use matrix operations to assign the target VM (or synthetic VM) as an entry in the matrix. The Cosine similarity function is can be described as shown below in equation (7).

$$\text{Similarity} = \cos(\theta) = \frac{A \cdot B}{\|A\| \cdot \|B\|} = \frac{\sum_{i=1}^{n} A_i B_i}{\sqrt{\sum_{i=1}^{n} A_i^2} \sqrt{\sum_{i=1}^{n} B_i^2}} \quad (7)$$

Where, in equation 7, A and B represent the two entries from matrix, M, as defined in equation (6). Once again, in some embodiments, the above-described Cosine similarity process is performed, for example, by similarity function module 820 of FIG. 8. Furthermore, in various embodiments, similarity function module 820, which performs the Cosine similarity process, comprises a portion of novel VM search module 802.

Further, in addition to, or in lieu of, using a similarity function, in various embodiments of the present invention, the present novel VM search module 802 VM also includes a classification model for service matching. In various embodiments, this classification model is used when the types of services in the system are well defined, and there are several VMs correctly labeled within each of the types of services. In various embodiments of the present invention, the classification model, utilized by the present novel VM search module 802, uses a OneVsRest approach. In such a OneVsRest approach, embodiments of the present invention fit one classifier per class, and the class is fitted against all of the other classes. One of the advantages of an embodiment of the present invention utilizing a OneVsRest approach is that an update in one class does not significantly impact the other classifiers. Hence, such an embodiment of the present novel VM search module 802 is a particularly well suited for use in the present invention.

Once again, in some embodiments, the above-described classification process is performed, for example, by classification module 818 of FIG. 8. Furthermore, in various embodiments, classification module 818, which performs the above-described classification process, comprises a portion of novel VM search module 802.

In various embodiments, the present novel VM search module 802 is implemented using, for example, but not limited to, Python using dataframe library Pandas, machine learning library scikit-learn, scientific computing library NumPy and Psycopg2 as PostgreSQL adapter for Python. Also, in various embodiments, the present novel VM search module 802 utilizes a feature such as, but not limited to, an AWS Elastic Beanstalk™ web server 810 of Amazon.com, Inc of Seattle, Washington supported by a Flask web framework.

Additionally, various embodiments of the present invention collect data from, for example, relational database service (RDS) tables corresponding to a security system such as, for example, the AppDefense™ platform 804 of VMware, Inc developed by VMware, Inc. of Palo Alto, California. In various embodiments of the present invention, such collected data may include, for example, but is not limited to, endpoint, allowed behaviors, alarm master, service, process cli, process, and connection data. Further, in embodiments of the present invention, the main processes and network behavior features are collected from the allowed behaviors and alarm master data tables.

Figure 9:
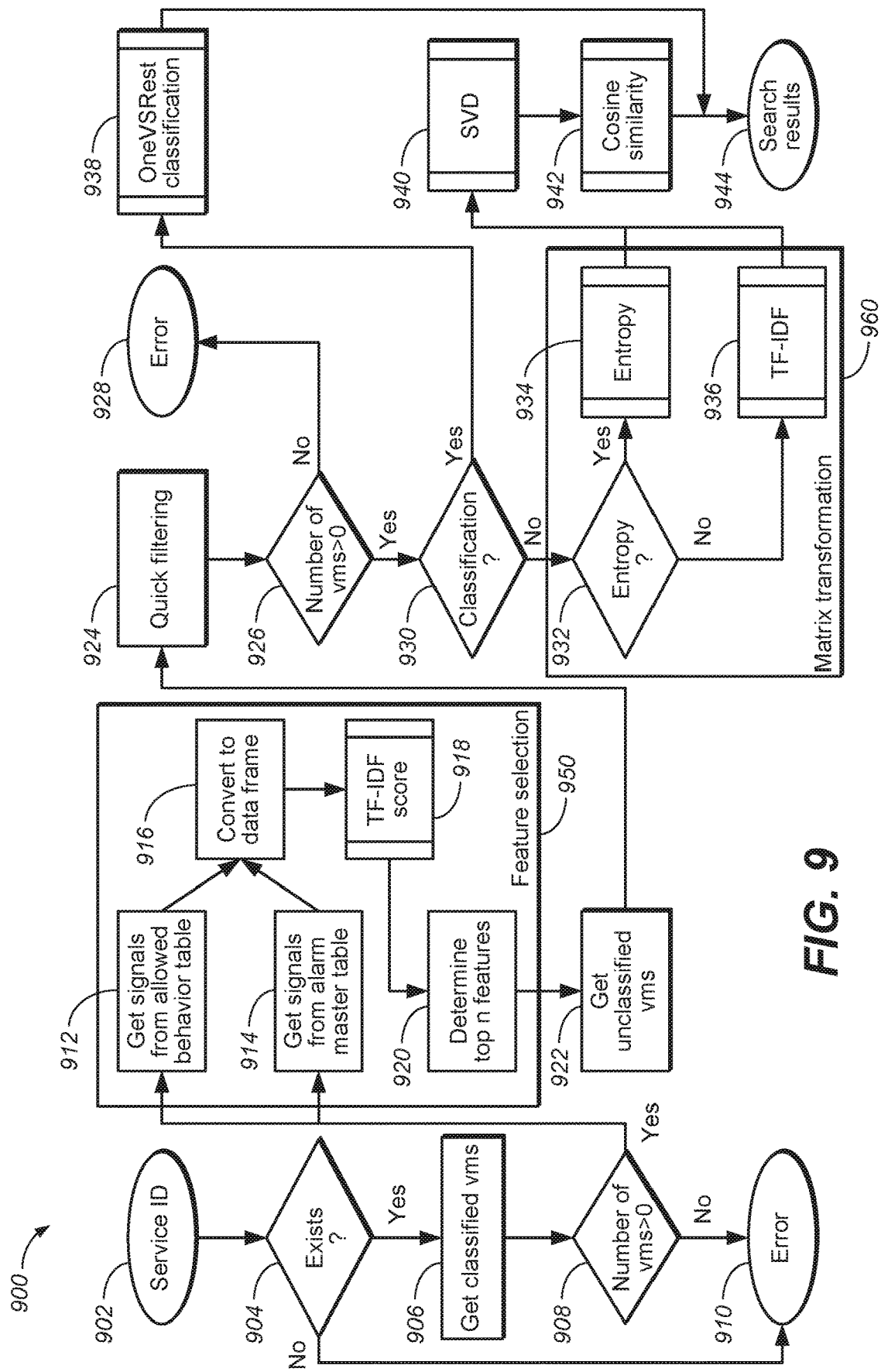
FIG. 9 is a schematic representation of a workflow (also referred to as a method of performance) of operations performed by the present novel virtual machine (VM) search module, in accordance with an embodiment of the present invention.

With reference now to FIG. 9, a schematic representation of a workflow 900 (also referred to as a method of performance) of operations performed by an embodiment of the present novel virtual machine (VM) search module 802 is provided. It should be noted that although the operations of workflow 900 are depicted in a certain order in FIG. 9, embodiments of the present invention may perform the various operations in an order which differs from the order of workflow 900. Additionally, in various embodiments of the present inventions, various operations may be added to workflow 900, and various of the operations in workflow 900 may be omitted.

Still referring to workflow 900 of FIG. 9, at 902, in one embodiment of the present invention, AppDefense MP 808 will send a search request to the present novel VM search module 802. Additionally, in various embodiments of the present invention, at 902, the search request will include a service identification (service id).

At 904 of workflow 900, the present novel VM search module 802 checks with the endpoint table, to confirm if the search request is valid. If the request is invalid the present novel VM search module 802 returns an error message, as shown at 910, to, for example, a graphic user interface used by the user to submit the search request at 902.

At 906 of workflow 900, the present novel VM search module 802 will utilize, for example, ML non-relational database (DB) 822 to find all the classified machines or components (e.g., but not limited to, virtual machines (VMs)) in the computing environment.

At 908 of workflow 900, if the present novel VM search module 802 determines that the number of classified machines or components within the computing environment is valid (e.g., non-zero), the present novel VM search module 802 will proceed to the feature selection portion 950 of workflow 900. As can be seen from FIG. 9, in the present embodiment, feature selection portion 950 is defined as including operations 912, 914, 916, 918 and 920. The operations of feature selection portion 950, as represented by operations 912, 914, 916, 918 and 920, will include, for example, the various feature selection analysis methods described above in detail, and which, in various embodiments, are performed by feature selection module 812 of FIG. 8.

Referring still to 908 of workflow 900, if the present novel VM search module 802 determines, at 908, that the number of classified machines or components within the computing environment is not valid (e.g., zero), the present novel VM search module 802 returns an error message, as shown at 910, to, for example, a graphic user interface used by the user to submit the search request at 902.

With reference next to feature selection portion 950 of workflow 900, the present novel VM search module 802 utilizes, for example, ML non-relational database (DB) 822, and obtain the process and network behavior data of the various machines or components (e.g., but not limited to, virtual machines (VMs)) in the computing environment as indicated at 912 and 914. In various embodiments of the present invention, the present novel VM search module 802 obtains the process and network behavior data of the various machines or components in the computing environment through allowed behavior and alarm master tables.

At 916 of workflow 900, the process and network behavior data of the various machines or components in the computing environment are converted from, for example, SQL query results to a data frame format and then input into, for example, the TF-IDF feature selection analysis model described above in detail.

At 918 of workflow 900, the present novel VM search module 802 ranks the obtained feature selection results in a manner as described above in detail. Additionally, at 918, the present novel VM search module 802 also weights the feature selection results corresponding to the given service in a manner as described above in detail.

At 920 of workflow 900, the present novel VM search module 802 utilizes the results obtained from operations 912, 914, 916 and 918 to determine the top features for the various machines or components in the computing environment.

Referring now to 922 of workflow 900, the present novel VM search module 802 finds all of the unclassified machines or components (e.g., but not limited to, virtual machines (VMs)) in the computing environment. In one embodiment, at 922, the present novel VM search module 802 finds all of the unclassified machines or components using an endpoint table.

At 924 of workflow 900, the present novel VM search module 802 performs a quick filtering process to quickly eliminate the unclassified machines or components (e.g., but not limited to, virtual machines (VMs)) in the computing environment which are not for the given service based upon major issues such as, for example, network connections, missing main features, and the like. At 924, if there are no unclassified machines or components left after the quick filtering process, the present novel VM search module 802 returns an error message, as shown at 928, to, for example, a graphic user interface used by the user to submit the search request at 902.

Referring still to 926, if the present novel VM search module 802 determines that the remaining number of unclassified machines or components within the computing environment after the quick filtering at 924 is valid (e.g., non-zero), the present novel VM search module 802 will proceed to 930 of workflow 900.

At 930 of workflow 900, the present novel VM search module 802 determines if all of the services in the system are well defined. At 930, if the present novel VM search module 802 determines that all services in the system are well defined, the present novel VM search module 802 proceeds to 938 to perform a classification of the services in the system.

Referring still to 930 of workflow 900, if the present novel VM search module 802 determines that all services in the system are not well defined, the present novel VM search module 802 proceeds to utilize a similarity score model analysis, as described above in detail. In one such embodiment, the present novel VM search module 802 will also utilize matrix transformation portion 960 of workflow 900. As can be seen from FIG. 9, in the present embodiment, matrix transformation portion 960 of workflow 900 is defined as including operations 932, 934 and 936. The operations of the matrix transformation portion 950, as represented by operations 932, 934 and 936, will include, for example, the various matrix transformation processes described above in detail, and which, in various embodiments, are performed by matrix transformation module 814 of FIG. 8.

Referring now to 938, the present novel VM search module 802 will utilize a OneVsRest approach as described above in detail, and which, in various embodiments, is performed by classification module 818 of FIG. 8. Upon the completion of 938, the present novel VM search module 802 returns the service label of each machine or component (e.g., but not limited to, virtual machines (VMs)). At 938, the present novel VM search module 802 provides such service labels an error message, as shown at 944, to, for example, a graphic user interface used by the user to submit the search request at 902.

With reference next to matrix transformation portion 960 of workflow 900, the present novel VM search module 802 converts data into a matrix of feature weight as described above in detail, and which, in various embodiments, is performed by matrix transformation module 814 of FIG. 8.

At 932 of workflow 900, the present novel VM search module 802 will perform either an entropy-based model process (as shown at 934) or a TF-I DF model (at shown at 936). The entropy-based model process (of 934) and the TF-IDF model (of 936) are described in detail above and are performed in various embodiments by, for example, feature selection module 812 of FIG. 8. At the completion of 934 or 936, the present novel VM search module 802 will proceed to 940 of workflow 900.

At 940, to reduce the computation cost in a large matrix case, the present novel VM search module 802 implements Singular Value Decomposition (SVD) to reduce the size of the matrix transformation output, as was described above in detail, and which, in various embodiments, is performed by dimension reduction module 816 of FIG. 8. At the completion of 940, the present novel VM search module 802 will proceed to 942 of workflow 900.

At 942, to find the most similar machines or components (e.g., but not limited to, virtual machines (VMs)), the present novel VM search module 802 utilizes a Cosine similarity process as was described above in detail, and which is performed, for example, by similarity function module 820 of FIG. 8. At the completion of 942, the present novel VM search module 802 returns the search results with the similarity scores, as shown at 944, to, for example, a graphic user interface used by the user to submit the search request at 902.

Hence, embodiments of the present invention greatly extend beyond conventional methods for providing security to machines or components of a computing environment. Moreover, embodiments of the present invention amount to significantly more than merely using a computer to provide conventional security measures to machines or components of a computing environment. Instead, embodiments of the present invention specifically recite a novel process, necessarily rooted in computer technology, for providing security to machines or components of a computing environment.

Furthermore, in various embodiments of the present invention, a security system, such as, but not limited to, the AppDefense™ platform 804 from VMware, Inc. of Palo Alto, California will include a novel security solution for a computing environment (including, but not limited to a data center comprising a virtual environment). In embodiments of the present invention, unlike conventional security systems which "chases the threats", the present security system focuses on monitoring the intended states of applications, machines or components of the computing environment, and the present security system will raise alarms if any anomaly behavior is detected.

Additionally, embodiments of the present invention provide a security system including a novel search feature for machines or components (including, but not limited to, virtual machines) of the computing environment. The novel search feature of the present security system enables ends users to readily assign the proper and scopes and services the machines or components of the computing environment, Moreover, the novel search feature of the present security system enables end users to identify various machines or components (including, but not limited to, virtual machines) similar to given and/or previously identified machines or components (including, but not limited to, virtual machines) when such machines or component satisfy a particular given criteria. Hence, in embodiments of the present security system, the novel search feature functions by finding or identifying the "siblings" of various other machines or components (including, but not limited to, virtual machines) within the computing environment.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What we claim is:

1. A computer-implemented method for automated analysis of features in a computing environment, said method comprising:

automatically monitoring components of said computing environment;

performing a feature selection analysis of said components of said computing environment;

provided said feature selection analysis determines that features of said components of said computing environment are well defined, performing a classification of said features of said components of said computing environment;

provided said feature selection analysis determines that features of said components of said computing environment are not well defined, performing a similarity analysis of said features of said components of said computing environment; and providing results of said method for automated analysis of said features of said components of said computing environment;

generating a matrix transformation output implementing a Singular Value Decomposition (SVD) to reduce the size of said matrix transformation output and wherein said performing a feature selection analysis of said components of said computing environment further comprises:

performing a Term Frequency-Inverse Document Frequency (TF-IDF) analysis method on said components of said computing environment.

2. The computer-implemented method of claim 1 wherein said performing a feature selection analysis of said components of said computing environment further comprises:

performing entropy-based analysis method on said components of said computing environment.

3. The computer-implemented method of claim 1 wherein said performing a feature selection analysis of said components of said computing environment further comprises:

performing a singular value decomposition on results obtained from said feature selection analysis of said components of said computing environment.

4. The computer-implemented method of claim 1 wherein said performing a similarity analysis of said features of said components of said computing environment further comprises:

performing a cosine similarity process on said features of said components of said computing environment.

5. The computer-implemented method of claim 1 wherein said providing results of said method for said automated analysis of said features of said components of said computing environment further comprises:

providing said results to a security system.

6. The computer-implemented method of claim 1 further comprising:

periodically repeating said automated analysis of said features in said computing environment to generate updated results of said automated analysis of said features of said components of said computing environment.

7. The computer-implemented method of claim 6 further comprising:

providing said updated results of said automated analysis of said features of said components of said computing environment to a security system.

8. The computer-implemented method of claim 1 further comprising:

automatically providing said results for said automated analysis of said features of said components of said computing environment without requiring intervention by a system administrator.

9. A computer-implemented method for automated analysis of features in a computing environment, said method comprising:

automatically monitoring components of said computing environment;

performing a feature selection analysis of said components of said computing environment, said feature selection analysis selected from the group consisting of: Term Frequency-Inverse Document Frequency (TF-IDF) analysis, and entropy-based analysis;

provided said feature selection analysis determines that features of said components of said computing environment are well defined, performing a classification of said features of said components of said computing environment;

provided said feature selection analysis determines that features of said components of said computing environment are not well defined, performing a similarity analysis of said features of said components of said computing environment;

generating a matrix transformation output implementing a Singular Value Decomposition (SVD) to reduce the size of said matrix transformation output and providing results of said method for automated analysis of said features of said components of said computing environment.

10. The computer-implemented method of claim 9 wherein said performing a similarity analysis of said features of said components of said computing environment further comprises:

performing a cosine similarity process on said features of said components of said computing environment.

11. The computer-implemented method of claim 9 wherein said providing results of said method for said automated analysis of said features of said components of said computing environment further comprises:

providing said results to a security system.

12. The computer-implemented method of claim 9 further comprising:

periodically repeating said automated analysis of said features in said computing environment to generate updated results of said automated analysis of said features of said components of said computing environment.

* * * * *